United States Patent [19]

Kasper

[11] Patent Number: 4,781,341
[45] Date of Patent: Nov. 1, 1988

[54] FLYING WING AIRCRAFT

[76] Inventor: Witold A. Kasper, 7747 — 115th Pl. NE., Kirkland, Wash. 98033

[21] Appl. No.: 307,861

[22] Filed: Oct. 2, 1981

[51] Int. Cl.⁴ .................. B64C 3/14; B64C 39/10
[52] U.S. Cl. .................. 244/13; 244/35 R; 244/199; 244/903; 244/45 R; 244/36
[58] Field of Search .................. 244/DIG. 1, 16, 13, 244/45 R, 90 R, 90 A, 91, 199, 35 R, 93

[56] References Cited

U.S. PATENT DOCUMENTS

| | | | |
|---|---|---|---|
| D. 259,554 | 6/1981 | Parise et al. | 244/199 |
| 1,022,903 | 4/1912 | Warrick | 244/DIG. 1 |
| 1,325,137 | 12/1919 | Brooke | 244/35 R |
| 1,576,995 | 3/1926 | Prowse | 244/219 |
| 1,862,803 | 6/1932 | Porter | 244/35 R |
| 1,915,055 | 6/1933 | Fauvel | 244/35 R |
| 3,438,597 | 4/1969 | Kasper | 244/16 |
| 3,831,885 | 8/1974 | Kasper | 244/199 |
| 4,206,892 | 6/1980 | MacCready, Jr. et al. | 244/DIG. 1.5 |
| 4,245,804 | 1/1981 | Ishimitsu et al. | 244/91 |
| 4,262,863 | 4/1981 | Slusarczyk | 244/13 |
| 4,372,506 | 2/1983 | Cronk et al. | 244/DIG. 1 |

OTHER PUBLICATIONS

"Manta Products", Bill Pregler, Hang Gliding Magazine, pp. 52–53, May 1978.

Primary Examiner—Galen Barefoot
Attorney, Agent, or Firm—Thomas W. Secrest

[57] ABSTRACT

An ultralight aircraft having a generally rectangular, swept-back, single-surface wing. The wing, which is formed by fabric mounted on exposed spars and ribs, has a reflex profile to provide pitch stability which is further augmented by horizontal stabilizers projecting rearwardly from the wing adjacent the tips. Roll and yaw control are provided by a pair of rudders pivotally mounted at each wing tip. The forward ends of the rudders pivot inwardly to alter the magnitude of the wing's lift. The rudders pivoted simultaneously act as spoilers and speed brakes controlling the rate of descent. Pivoting one of the rudders individually moves the center of lift for one wing inwardly and increases the drag of that wing to roll the aircraft into that wing. The rudders tilt upwardly and outwardly in a dihedral configuration to provide roll stability. Stationary end plates mounted at each wing tip adjacent the rudders provide yaw stability. The aircraft utilizes a single surface wing so that it can descend safely at zero forward speed in a parachute-like manner. Pitch control is made by shifting the pilot's body forward and back. A chassis mounted beneath the wing supports a pilot and a gasoline engine driving a pusher propeller.

3 Claims, 2 Drawing Sheets

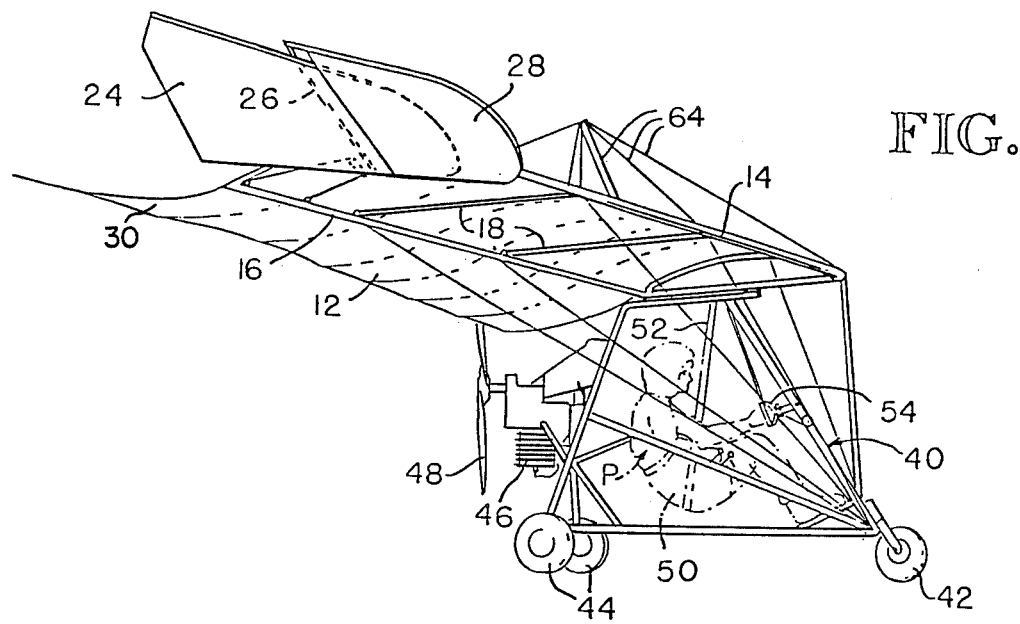
FIG. 3
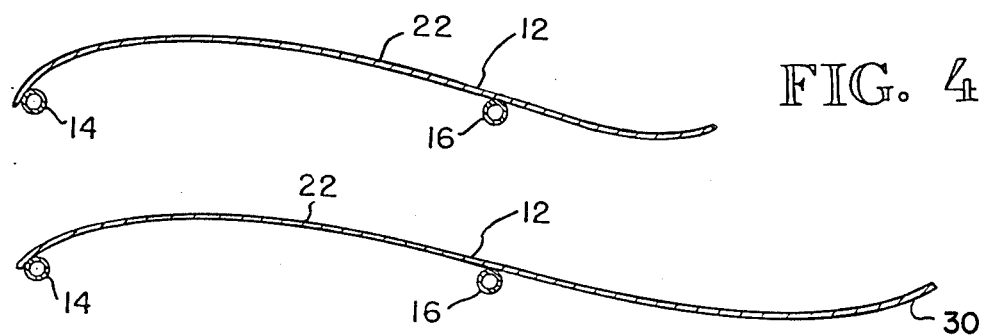
FIG. 4
FIG. 5
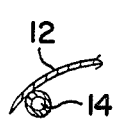
FIG. 6

FLYING WING AIRCRAFT

DESCRIPTION

1. Technical Field

This invention relates to gliders or to propeller-driven aircraft, and more particularly, to a flying wing aircraft which is inherently stable about its roll, pitch and yaw axes and which does not stall at even zero forward speed.

2. Background Art

Conventional aircraft generally utilize a wing for lifting the aircraft and a fuselage having a horizontal stabilizer and elevator for controlling the pitch of the aircraft and a vertical stabilizer and rudder for controlling the yaw of the aircraft. Roll control of the aircraft is normally effected by ailerons mounted along the outer rear edges of the wing. The center of gravity of the aircraft is normally located forward of the center of lift, thereby generating a pitch-down moment. To counteract this pitch-down moment, the horizontal stabilizer and elevator produce a downward force to generate an equal pitch-up moment.

In variations of this basic theme, for example, the horizontal stabilizer and elevator can be combined in a single stabilator. Upwardly pivoting spoilers may be used in place of upwardly pivoting ailerons. In fact, the elevator may even be positioned in front of the wing in a canard configuration which permits the placing of the center of gravity of the aircraft very much ahead of the center of lift, where the canard wing produces an upward force to balance the down moment of the aircraft. Yet these aircraft all utilize the same basic principle, namely, a control surface for generating a pitch force in one direction to couteract an opposite pitch force generated by the center of gravity being offset by the center of lift.

Attempts have been made to provide "flying wing" aircraft which do not have an empennage. Such aircraft have largely failed because of the difficulty in obtaining sufficient pitch stability. However, the wing-only aircraft described in U.S. Pat. No. 3,438,597 has been successfully flown. The aircraft described therein has a swept-back wing, a vertical end panel at the tip of each wing which pivots outwardly for yaw control, horizontal stabilizers projecting rearwardly from the rear edge of each wing adjacent the top, and conventional elevons (combination ailerons and elevators) for both pitch and roll control. Although the wing-only aircraft described in U.S. Pat. No. 3,438,597 manages to achieve adequate pitch stability, it nevertheless utilizes the conventional concept of an elevator and ailerons for pitch and roll control, respectively. Moreover, the configuration of the wing does not provide any inherent roll stability. Although the wing does have a slight dihedral configuration which normally provides stability, this dihedral configuration disappears for a swept-back wing at higher angles of attack. Yet it is at higher angles of attach where roll stability is most needed. The aircraft described in U.S. Pat. No. 3,438,597 also utilizes a reflex airfoil for better pitch stability, but the forces from the elevator being a function of forward speed do not permit pitch control at zero forward speed. The minimum forward speed of this aircraft is thus limited to one-third of the stalling speed.

DISCLOSURE OF THE INVENTION

It is an object of the invention to provide a wing-only aircraft which has excellent stability in all three axes at any speed.

It is another object of the invention to provide a wing-only aircraft which is incapable of stalling even at zero forward speed.

It is another object of the invention to provide a wing-only aircraft having control surfaces which remain effective at zero forward air speed.

It is still another object of the invention to provide a wing-only aircraft having no adverse yaw characteristics and which inherently turns in a coordinated manner.

These and other objects of the invention are provided by a wing-only aircraft having a swept-back wing with a reflex profile. The wing is positioned so that the center of gravity of the aircraft and the center of lift of the wing are at approximately the same location so that relatively small changes in position of the center of lift or gravity pitch the aircraft up or down. The wing has a horizontal stabilizer panel extending rearwardly from the rear edge of the wing adjacent to each end in order to provide inherent pitch stability. A rudder is pivotally mounted at each end of the wing so that the front portion can pivot inwardly. The rudders may be pivoted inwardly together, thereby moving the center of lift along the wing. The rudders may be individually pivoted to increase the drag on one side of the wing. The speed of that wing tip is thereby reduced in order to cause the lift at the tip of the wing to decrease, thereby causing the aircraft to roll into the deflected rudder. In contrast to conventional aircraft, actuating the rudder causes the drag of the roll-producing control surface to act as a spoiler in the same direction of the roll so that there is no adverse yaw. The rudders are tilted outwardly from the wing in a dihedral configuration to provide roll stability. Although the wing may assume a conventional upper and lower surface configuration, it is preferably a single-surface wing so that it can safely descend at zero forward speed without stalling. The yaw and roll stability may be further augmented by stationary end panels mounted at the tips of the wings adjacent the rudders. A rigid chassis mounted beneath the wing houses the pilot and mounts a gasoline egine driving a propeller. A brace projects upwardly from the chassis above the wing, and a plurality of guide wires extend from the chassis to the lower surface of the wing and from the brace to the upper surface of the wing in order to prevent bending of the wings.

BRIEF DESCRIPTION OF THE DRAWINGS

FIG. 3 is a side elevational view of the aircraft of FIG. 1;

FIG. 4 is a cross-sectional view taken along the line 8—8 of FIG. 1.

FIG. 5 is a cross-sectional view taken along the line 9—9 of FIG. 1.

FIG. 6 is a cross-section view wherein the leading edges of said wing include a relatively sharp, downwardly extending projection to minimize the drag of said wing.

BEST MODE FOR CARRYING OUT THE INVENTION

Figure 1:
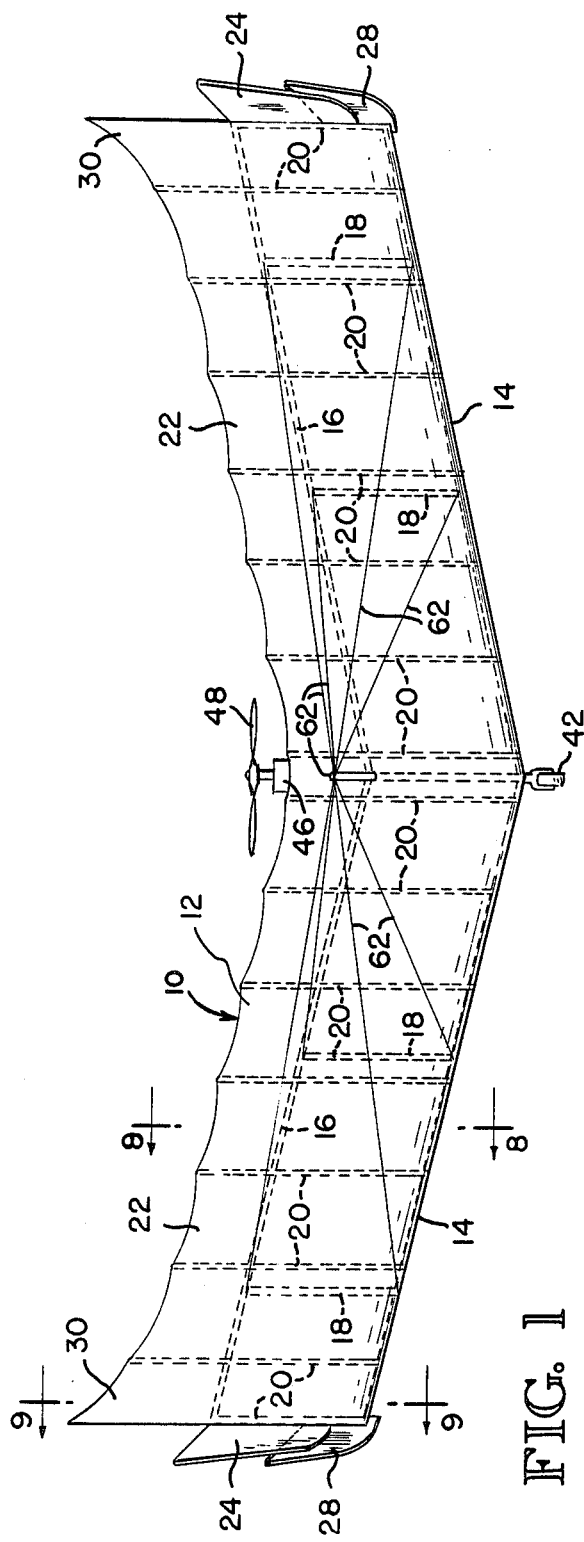
FIG. 1 is a top plan view of an ultralight airplane utilizing the inventive wing configuration.
Figure 2:
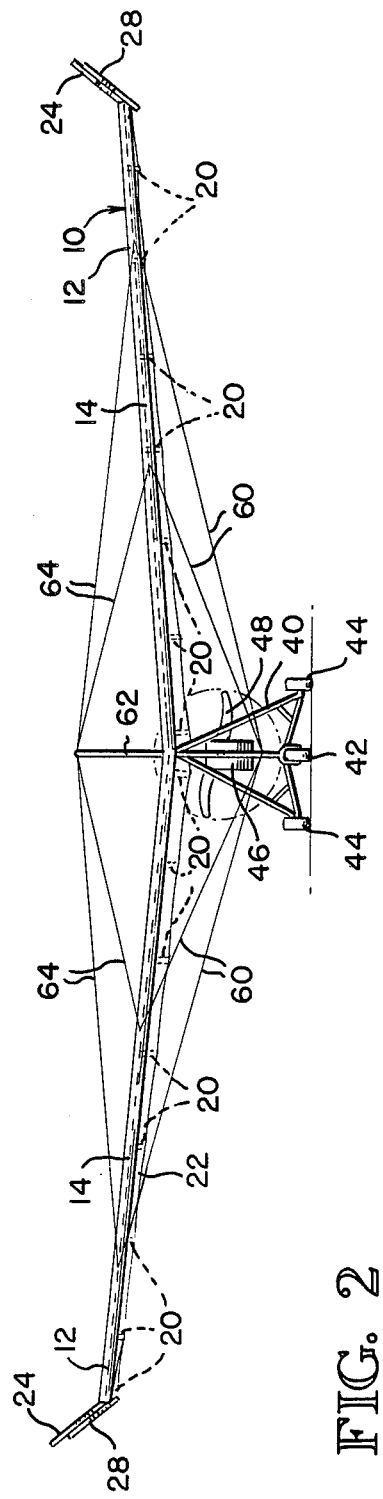
FIG. 2 is a front elevational view of the aircraft of FIG. 1.

"An ultralight embodiment of the inventive wing-only aircraft 10, " as used herein, means an aircraft having no empennage but which may, in fact, be a biplane as long as it does not have an empennage. The aircraft utilizes wings 12 which are swept-back and of a preferably uniform width configuration. The wings are formed by a pair of longitudinal spars 14,16 separated from each other by laterally extending braces 18. The profile of the wings is fixed by a plurality of laterally extending ribs 20 which are mounted on the spars 14,16. The ribs 20 and the spars 14,16 are covered with fabric 22 of suitable strength, such as dacron. As best illustrated in FIGS. 3, 4 and 5, the fabric 22 and ribs 20 are mounted above the spars 14,16 so that the spars 14,16 are exposed below the wing. The result is a single-surface wing which allows the aircraft to safely descend at zero forward speed by acting as a parachute. The pitch control independent of forward speed is obtained by moving the pilot's weight forward and aft.

As best illustrated in FIGS. 4 and 5, the wings 12 preferably have a reflex profile in which the rear edges of the wings 12 are turned upwardly. As indicated by a comparison of FIGS. 4 and 5, the reflex profile at the ends of the wings is exaggerated by a horizontal stabilizer 30 formed along the rear edges adjacent each wing tip. The horizontal stabilizer further augments the pitch stability provided by the reflex profile of the wings, especially in the vertical descent operation.

A chassis 40 is mounted below the wings 12. The chassis 40 is of a generally triangular configuration formed by a plurality of tubular members interconnected at the front. A nose wheel 42 and main wheels 44 support the chassis 40 as the aircraft rolls along the ground for relatively short takeoff and landing rolls. A conventional gasoline engine 46 driving a propeller 48 is mounted on the chassis 40. The pilot sits in a harness 50 which is suspended by a line 52 from the chasses 40. As a result, the pilot can shift his or her weight to trim and to control the pitch of the aircraft independently from the forward speed. A pivotally mounted control wheel 54 actuates the rudders 24 to roll, yaw and brake the aircraft, as described in U.S. Pat. No. 3,438,597 as described in column 3, lines 20 through 54. The phrasing of column 3, lines 2054 in regard to the subject references is as follows. The rudders 24 mounted in each wing tip 12 continue the inplate configuration during straight away flight. Each rudder 24 has a forward pivotal or balancing portion which becuse of it's overlapping contact with a vertical stabilizer 28 is deflectable only in an inboard direction. When so pivoted, it spoils the lift at the wing tip and induces desired braking. Each rudder 24 has it's rear pivotal portion which only deflects outboard to create a turning force to supplement it in the desired directional change as the wing lift is spoiled by the forward portion of the rudder. Movement of one rudder causes a pefectly coordinated turn of the gliding aircraft 10. Such movement of the rudder is akin to servo function. Movement of both rudders 24 simultaneously converts their rudder actions first to spoiler actions and then after full deflection operationally converts the rudders 24 onto effective air brakes. Where only one rudder is being used initially in a turn, the other rudder may be used subsequently to create a counter force to slow up the turning rate. The rudders 24 in combining with the vertical stabilizers 28 when aligned, with or without a toe in, during straight flight as endplates reduce the wing tip induced drag, act as air stream guides over the outboard portion of the swept wing.

The wing 12 is braced by a plurality of guy lines 60 extending from the chassis 40 to spaced-apart points on the underside of the wing 12. A brace 62 extends upwardly from the chassis 40, and a plurality of guy lines 62 extend from its upper end to spaced-apart points on the upper surface of the wing.

The rudders 24, acting individually, control the roll of the aircraft 10. As one of the rudder's tips pivots inwardly, it acts as a spoiler, destroys the lift on this wing tip, and causes the aircraft to roll. The pivoting rudder 24 also increases the drag at this wing. As a result, the speed of this wing drops, thereby further reducing the lift of the wing. As a result, the aircraft rolls toward the wing tip on which the rudder was actuated. At the same time, the outside part of the rudder produces drag, causing the aircraft to yaw in the same direction. As a result, the turn is accomplished in a coordinated manner without adverse yaw.

As mentioned above, a highly desirable feature of this aircraft is the ability to safely descend at zero forward speed. This characteristic is caused by the use of the single-surface wing, which causes the aircraft to act like a parachute. Moreover, the rudders 24 remain effective to roll or yaw the aircraft during the zero speed descent so that the aircraft can be maneuvered and the aircraft may return to normal flight at any time. Additionally, the rudders, when actuated simultaneously, act as spoilers and airbrakes, permitting the pilot to regulate the rate of descent.

The pitch control during this vertical descent is controlled by the movement of the pilot, which also does not depend on the forward speed.

There is a stationary end panel 28 positioned at the tip of each wing adjacent one of said rudders 24, said end panels 28 projecting outwardly and upwardly from said wings in a dihedral configuration to provide roll stability for said aircraft 10.

I claim:
1. A propeller driven wing-only aircraft having:
   a. swept-back single surface wings with a reflex profile wherein the rearward part of the wings curve upwardly to assist in allowing said aircraft to safely descend with no forward speed and free of stalling;
   b. said wings being positioned so that the center wings are at approximately the same location so that relatively small changes in position of the center of gravity pitch the aircraft up and down;
   c. a load-carrying chassis operatively connecting with said wings and mounted below said wings;
   d. an engine mounted on said chassis and operatively connecting in a driving relationship to a propeller;
   e. said chassis having means on which the pilot is positioned and which means are movable forward and aft to assist in determining the pitch of the aircraft;
   f. said aircraft including a rudder pivotally mounted at the tip of each wing in a manner that allows the front portion thereof to pivot inwardly to act as a spoiler and therfore to vary the magnitude and position of the lift generated by the wing on which the rudder is mounted;
   g. said aircraft further including rudder actuating means having the ability to selectively move either of said rudders to control the roll and yaw of said aircraft and also having the ability to move simultaneously to act as spoilers and airbrakes;

h. said rudders project outwardly and upwardly from said wings in a dihedral configuration to provide roll stability for said aircraft; and, i. wherein said rudders are pivotally secured to said wings about an axis that extends rearwardly above said wings so that the lower front edges of said panels remain substantially parallel to the upper surface of said wings as they pivot in order to effectively alter the magnitude and location of the center of lift of said wings for all positions of said rudders.

2. A properller driven wing-only aircraft according to claim 1:

j. said rudders are mounted in a towed-in position to assure the yaw stability of the aircraft.

3. A propeller driven wing-only aircraft having:

a. swept-back single surface wings with a reflex profile wherein the rearward part of the wings curve upwardly to assist in allowing said aircraft to safely descend with no forward speed and free of stalling;

b. said wings being positioned so that the center of gravity of said aircraft and the center of lift of said wings are at approximately the same location so that relatively small changes in position of the center of gravity pitch the aircraft up and down;

c. a load-carrying chassis operatively connecting with said wings and mounted below said wings;

d. an engine mounted on said chassis and operatively connecting in a driving relationship to a propeller;

e. said chassis having means on which the pilot is positioned and which means are movable forward and aft to assist in determining the pitch of the aircraft;

f. said wing formed by a plurality of rigid spars and ribs;

g. a fabric operatively connected to said rigid spars and ribs on one surface of said rigid spars and said ribs;

h. including a horizontal stabilizer panel extending rearwardly from the rear outer edge of each wing adjacent to the tip thereof for increasing the pitch stability of the aircraft and for preventing pitch-down after a stall;

i. said wings forming a dihedral angle;

j. a stationary end panel positioned at the tip of each wing;

k. said end panels projecting outwardly and upwardly from said wings in a dihedral configuration to provide roll stability for said aircraft;

l. said aircraft including a brace projecting upwardly from said chassis above said wings and plurality of guidewires extending from said brace to the upper surface of said wings.

m. a plurality of guidewires extending from said chassis to the lower surface of said wings;

n. said aircraft including a rudder pivotally mounted at the tip of each wing in a manner that allows the front portion thereof to pivot inwardly to act as a spoiler and therfore to vary the magnitude and position of the lift generated by the wing on which the rudder is mounted;

o. said aircraft further including rubber actuating means having the ability to selectivly move either of said rudders to control the roll and yaw of said aircraft and also having the ability to move simultaneously to act as spoilers and airbrakes;

p. said rudders project outwardly and upwardly from said wings in a dihedral configuration to provide roll stability for said aircraft;

q. wherein said rudders are pivotally secured to said wings about an axis that extends rearwardly above said wings so that the lower front edges of said panels remain substantially parallel to the upper surface of said wings as they pivot in order to effectively alter the magnitude and location of the center of lift of said wings for all positions of said rudders;

r. said rudders are mounted in a towed-in position to assure the yaw stability of the aircraft; and, s. the leading edges of said wing include a relatively sharp, downwardly extending projection to minimize the drag of said wing.

* * * * *